United States Patent [19]

Chiantella

[11] Patent Number: 4,848,422
[45] Date of Patent: Jul. 18, 1989

[54] ROTARY SPINDLE FORMER

[75] Inventor: Michael J. Chiantella, New Orleans, La.

[73] Assignee: Michael J. Chiantella, Baton Rouge, La.

[21] Appl. No.: 130,890

[22] Filed: Dec. 10, 1987

[51] Int. Cl.$^4$ ............................ B23B 3/28; B27C 7/06
[52] U.S. Cl. ......................................... 142/37; 142/49; 82/11.1; 82/12
[58] Field of Search ..................... 82/14 R, 12, 2 E; 142/1, 7, 9, 40, 55, 37, 49

[56] References Cited

U.S. PATENT DOCUMENTS

| 271,702 | 2/1883 | Griggs | 142/50 |
|---|---|---|---|
| 1,427,213 | 8/1922 | Lapp | 425/268 |
| 1,540,801 | 6/1925 | O'Neel | 142/37 |
| 2,001,306 | 5/1935 | Gressner | 144/138 |
| 2,622,635 | 12/1952 | Mason | 142/38 |
| 2,715,924 | 8/1955 | Norris | 144/205 |
| 2,818,896 | 1/1958 | Bailey | 144/205 |
| 3,388,729 | 6/1968 | Edwards | 142/40 |
| 3,512,561 | 5/1970 | Cortez | 142/55 |
| 3,768,527 | 10/1973 | Messick | 82/14 R |
| 3,841,370 | 10/1974 | Schell | 144/144.5 R |
| 4,061,165 | 12/1977 | Harwood et al. | 144/1 R |
| 4,627,477 | 12/1986 | Wise | 142/7 |

FOREIGN PATENT DOCUMENTS

| 605319 | 9/1960 | Canada | 142/7 |
|---|---|---|---|
| 2365349 | 11/1974 | Fed. Rep. of Germany | 144/136 H |

OTHER PUBLICATIONS

Rockwell Industrial Machinery, p. 4, Rockwell International Corp., Section 2N.

Primary Examiner—Frederick R. Schmidt
Assistant Examiner—William E. Terrell
Attorney, Agent, or Firm—J. F. Sieberth

[57] ABSTRACT

In the apparatus a workpiece is rotated in a fixed position about an axis. A template is aligned with and spaced to one side of this axis. A platform is positioned above the workpiece and hinged on the other side of the axis so that it can be pivoted and thereby raised and lowered relative to the workpiece. The platform can also be caused to move along the axis of the workpiece and as this occurs, a tracing pin on the platform causes the platform to be raised and lowered in response to changes in the upper contour of the template. A rotary saw or like rotary cutting blade device is mounted on the platform above the workpiece so that the cutting blade can be brought into contact with and moved along the upper portion of the rotating workpiece to cause the workpiece to be shaped. Preferably the blade and the workpiece rotate in the same direction so that they are moving in opposite directions at the point or zone where they contact each other.

13 Claims, 2 Drawing Sheets

ROTARY SPINDLE FORMER

TECHNICAL FIELD

This invention relates to rotary apparatus for forming spindles of various shapes and configurations.

BACKGROUND

It is common practice to employ lathes and cutting tools such as chisels to form shaped spindles such as table and chair legs, candlestick holders, balusters, lamp and flag standards, and the like. When it is desired to duplicate configurations from piece to piece, wood turning duplicators are often used in conjunction with the lathe.

While the combination of a lathe, chisel, and a wood turning duplicator accomplishes the desired job, the cost of such equipment is not insignificant. Furthermore, even when exercising considerable care in conducting such turning operations, a considerable amount of drag and chatter is frequently encountered as between the stationary cutting tool (e.g., chisel) and the rotating stock. And, in order to make use of a duplicator, rounded or cylindrical stock must be employed—it is not feasible to conduct the turning operation with stock having sharp edges, such as square stock or the like.

A desirable and worthwhile contribution to the art would be a way of reproducing in turned pieces the same configuration from piece to piece without need for such expensive equipment as lathes and duplicators and without encountering the difficulties and limitations inherent in the use of such equipment. This invention is believed to fulfill this need in an efficient and economical manner.

SUMMARY OF THE INVENTION

In accordance with this invention, novel spindle forming apparatus is provided which, among other things, makes effective use of the force of gravity to insure replication from piece to piece. The apparatus can utilize workpieces having any of a wide variety of cross-sectional shapes—the workpieces need not be cylindrical or have rounded edges to start with. Spindles having a wide range of configurations and shapes may be readily produced, workpiece breakage is rare, no cutting tool drag or chatter is encountered during use, and prior experience, skill or training of the user are not required. Operational hazards are minimal provided ordinary, reasonable care is exercised by the user. And in one of its embodiments, this invention makes it possible to utilize two types of common power tools as components of the overall spindle forming apparatus. Yet with almost no effort or delay, these power tools may be separately used for their normal purposes.

In one of its forms this invention provides spindle forming apparatus which comprises (a) means for rotating a workpiece in a fixed position about an axis; (b) a template adapted to be laterally spaced from and aligned with said axis, the template having an upstanding surface contoured to the profile to be formed in the workpiece; (c) a rotatable power-driven cutting blade assembly; (d) support means longitudinally movable with respect to at least a portion of said axis and pivotally supporting the power-driven cutting blade assembly above the workpiece so that the cutting blade can be brought into contact with the upper portion of the workpiece and moved along and above at least a portion of said axis; and (e) tracing means disposed on said support means so as to be in registration with the contoured surface of the template and adapted, by virtue of the weight of the support means and the power-driven cutting blade assembly, to stay in registration with said contoured surface as the support means is moved longitudinally with respect to at least a portion of said axis, the distance between the cutting blade and the axis of the workpiece being defined by the registration between the tracing means and the contoured surface of the template. While it is possible to produce spindles satisfactorily by having the blade of the rotatable power-driven cutting blade assembly and the workpiece rotate in opposite directions, it is preferable that they both rotate in the same direction. In this way they are actually moving in opposite directions at the point or zone of contact.

The rotatable power-driven cutting blade assembly can be composed of common, readily available power tools such as a portable rotary saw or the like. The means for rotating the workpiece in a fixed position about an axis is preferably composed of a headstock adapted to grip and rotate one end of the workpiece, a tailstock adapted to be positioned to secure and allow free rotation of the other end of the workpiece, and a motor adapted to rotate the headstock. Here again, use may be made of readily available power tools for effecting rotation of the headstock, such as a portable electric hand drill unit or the like, the bit of which can be readily connected to and detached from an appropriately sized shaft or axle on or connected to the headstock.

It will of course be understood that the spindle forming apparatus of this invention need not utilize separate power tools—it may be fabricated as a complete entity in and of itself.

In another of its forms this invention involves a subassembly adapted for use in forming spindles having a predetermined profile. This sub-assembly, which is adapted to receive and utilize two common power driven tools during the spindle forming operation, comprises (a) rotatable means for detachably securing a workpiece in a fixed position so that the workpiece can be rotated about a first axis while in said fixed position; (b) an elongate template having a surface contoured to the profile to be formed in the workpiece; (c) means for receiving, detachably securing and supporting a rotatable power driven cutting blade unit above the workpiece with the cutting blade in a upright position transverse to said axis and with the lower portion of the cutting edge of the cutting blade extending downwardly from the means of (c) so as to be contactable with the workpiece; (d) means for pivotally supporting the means of (c) along a second axis aligned with and laterally displaced from said first axis so that the cutting edge of the cutting blade can be brought into contact with the upper portion of the workpiece when the workpiece is in said fixed position, the means of (d) being further characterized by enabling longitudinal movement of the means of (c) so that the cutting edge of the cutting blade can be moved along and above at least a portion of said first axis when the workpiece is in said fixed position; (e) means for securing the template along a third axis with the contoured surface of the template facing upwardly, the third axis being laterally displaced from said first axis, said second axis and said third axis being on opposite sides of said first axis; and (f) tracing means disposed on said means of (c) so as to be in registration with the contoured surface of the template and adapted to remain in registration with said contoured surface as the means of (c) is moved longitudinally with respect to at least a portion of said first axis.

These and other features and embodiments of this invention will be apparent from the ensuing description, appended claims, and accompanying drawings.

BRIEF SUMMARY OF THE DRAWINGS

In the Drawings, like numerals depict like parts among the several Figures. The parts shown are not necessarily in scale, since they are shown for purposes of illustration only.

FURTHER DESCRIPTION OF THE INVENTION

Figure 1:
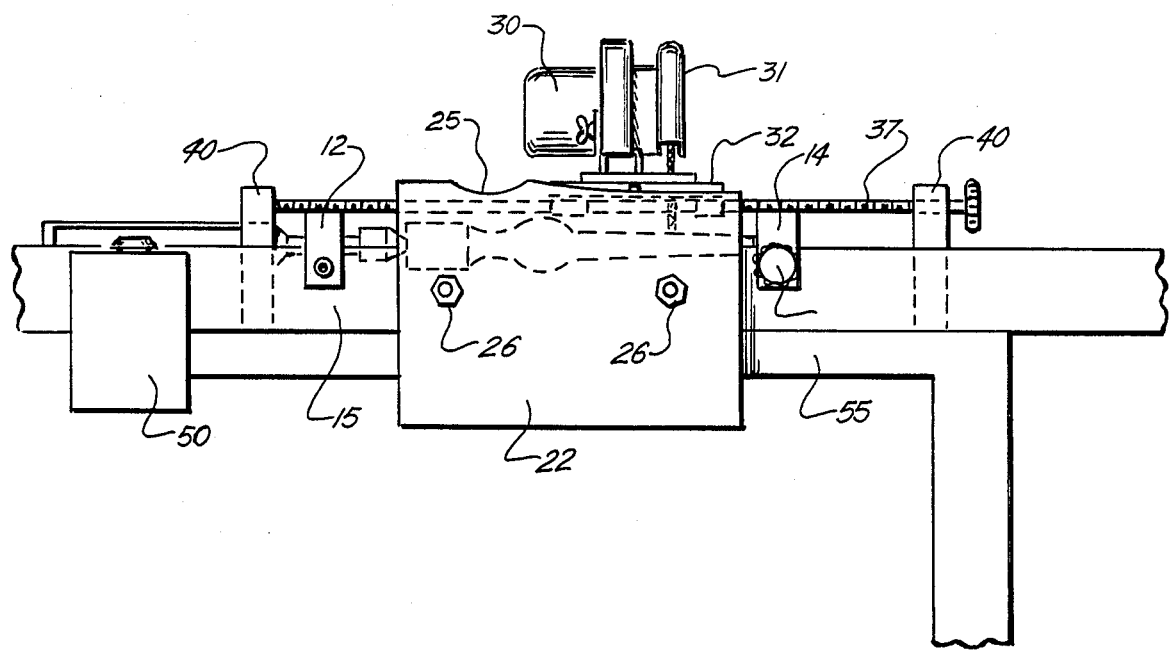
FIG. 1 is a fragmentary side view, partly in phantom, of a preferred spindle forming apparatus of this invention.

Referring now to the Drawings, workpiece 10 is rotatably supported in fixed position between end plates 12 and 14. In the form depicted, end plate 12 is secured to side rail 15 so that end plate 12 remains in fixed position in the apparatus. On the other hand, end plate 14 is clamped onto side rail 15 by means of set screw 16 and thus can be moved toward or away from end plate 12 to accommodate workpieces of varying lengths.

The knob on set screw 16 facilitates its manual rotation when it is desired to tighten or to loosen the set screw. It will be appreciated of course that end plate 12 can also be adjustable in the same manner as end plate 14 so that its position may be changed in the same manner as end plate 14. Alternatively, end plate 14 may be mounted in fixed position with end plate 12 being adjustable.

Figure 3:
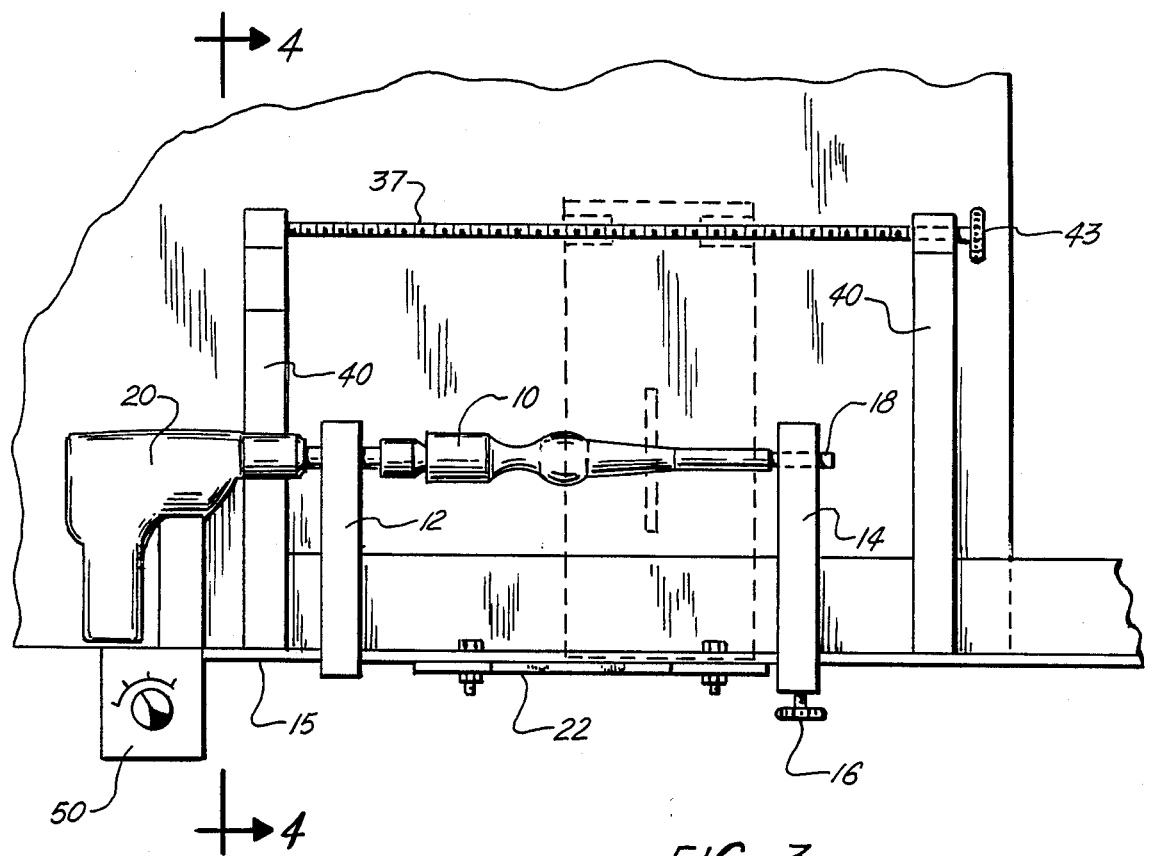
FIG. 3 is a fragmentary top view, partly in phantom, of the apparatus of FIG. 1.
Figure 4:
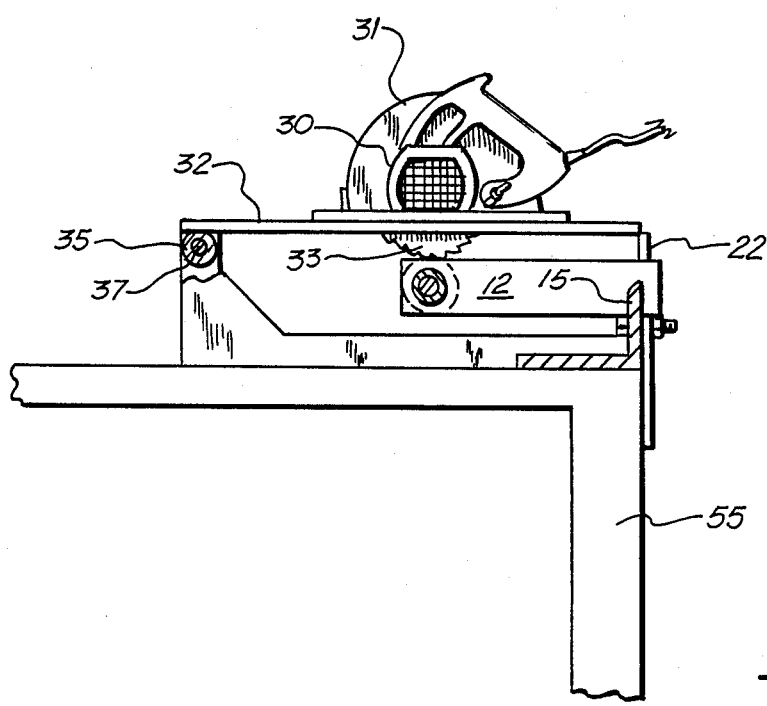
FIG. 4 is a fragmentary end view, partly broken away, of the apparatus of FIG. 1 viewed along line 4,4 of FIG. 3.

As best seen in FIG. 3, end plate 14 carries tailstock 18 to permit rotation of the workpiece about its axis. The opposite end of the workpiece is rotatably secured in place by any means such as a headstock (not shown) the details and construction of which are conventional and well known. One convenient form of headstock is composed of a disc, an axial shaft attached to one side of the disc (which can be gripped by the chuck of a power hand drill unit), a center spike extending axially from the other side of the disc, and a plurality of smaller outer spikes radially positioned on and extending from the same side of the disc as the center spike. Workpiece 10 is caused to rotate about its axis by motor 20 which, in the form depicted, is a conventional hand-held power drill unit equipped with an electric motor. In this way, the drill unit may be attached to the headstock when used in the apparatus of this invention and detached therefrom when being put to its conventional uses. This feature is advantageous for home workshops and the like as it reduces the cost of the system and enables a common power tool to be used for a multiplicity of purposes. For commercial service, a suitably mounted electric motor may be provided with the system for exclusive use therewith in rotating the workpieces.

Laterally spaced from the axis of workpiece 10 and aligned therewith is template 22 having an upwardly facing surface 25 contoured to the profile to be formed in the workpiece. Template 22 is secured in an appropriate upstanding position against side rail 15 by bolts and nuts 26, 26 or any other attachment means. In most cases, it is desirable to employ detachable attachment means for securing template 22 in place in the assembly as this enables a plurality of templates to be used interchangeably. Thus a plurality of templates with surfaces 25 having differing contours may be provided for use in the assembly in order to produce spindles of varying shapes and sizes. It is also desirable to enable the position of the template to be adjusted upwardly and downwardly relative to the workpiece so that spindles of varying thicknesses may be produced from any given template. This adjustability can be accomplished in various ways, as for example by providing vertical slots instead of round holes to receive and accommodate bolts and nuts 26, 26 whereby the template may be placed at the elevation desired and then secured in that position by tightening the bolts and nuts 26, 26 so that the template is rendered immovable. In any instance where it is desired to replicate spindles of the same shape and size from a large number of workpieces of the same size, as for example in a furniture factory producing thousands upon thousands of the same item, template 22 may be permanently secured in its proper place on the assembly.

The lateral spacing and alignment of template 22 relative to the axis of workpieces 10 is illustrated and can be perceived most readily from FIG. 3.

Shaping of the spindles is effected by a rotatable power-driven cutting blade assembly which in the form depicted is a rotary power saw 30 which is bolted onto platform 32 with cutting blade 33 in an upright position. Platform 32 is positioned above workpiece 10. The lower portion of cutting blade 33 extends below the platform and thus can be brought into contact with the upper portion of the workpiece. It will also be seen that cutting blade 33 is transverse to the axis of the workpiece. For safety reasons, most if not all of cutting blade 33 disposed above platform 32 is encased by shield 31.

Use of a conventional rotary power saw in the apparatus of this invention allows a readily-available power tool to be put to a new use—shaping spindles pursuant to the practice of this invention. And since saw 30 can be quickly and easily installed and removed from the apparatus of this invention, it remains readily available for its customary use as a saw. Thus this invention makes it possible for the operator to avoid the expense of purchasing a separate power unit for driving the cutting blade. However, professional models of the apparatus of this invention can also be provided as a specialized piece of equipment adapted for repeated heavy-duty service. In this instance, the apparatus can be equipped with its own permanent rotatable power-driven rotary cutting blade assembly or unit.

Platform 32 is pivotally supported along its side remote from template 22. In addition, the means for effecting this pivotal support enables platform 32 to be moved longitudinally—i.e., from both left to right and right to left in FIGS. 1 and 3. In the form depicted in the Drawings, the pivotal and longitudinally movable support for platform 32 is furnished by hinges 35, 35 and rod 37 which is rotatably supported near its ends by stanchions 40, 40. The hinges 35, 35 are affixed to the underside of platform 32 and allow platform 32 to pivot on rod 37. The exterior of rod 37 and the interior pivotal surfaces of hinges 35, 35 are equipped in the preferred form depicted with matching machine threads so that rotation of rod 37 causes axial movement of the hinges along rod 37 and thus longitudinal movement of platform 32 along the axes of workpiece 10, template 22 and rod 37. Knob 43 enables rod 37 to be rotated manually to effect this longitudinal movement.

It will be noted therefore that in the preferred form depicted, hinges 35, 35 and rod 37 serve a multiplicity of functions. They furnish support to platform 32. Secondly, they allow platform to pivot around the axis of rod 37. And thirdly they cause platform 32 to move longitudinally when rod 37 is itself rotated. Thus by rotating knob 43 and hence rod 37 in one direction, platform 32 and the power-driven cutting blade 33 are caused to move longitudinally in one direction so that cutting blade 33 is moved along and above and transverse to at least a portion of the axis about which workpiece 10 is rotated by motor 20. Rotation of knob 43 in the opposite direction of course causes platform 32 (and cutting blade 33) to move longitudinally in the reverse direction.

It is also to be noted that the axis of rod 37 is laterally displaced from and is aligned with the axis around which workpiece 10 is rotated and that the axis of rod 37 and the axis of template 33 are on opposite sides of the axis of rotation of the workpiece. For best results, these three axes should be substantially parallel with each other, although some minor non-parallelism can be tolerated. All of these features will be readily apparent from FIG. 3.

Figure 2:
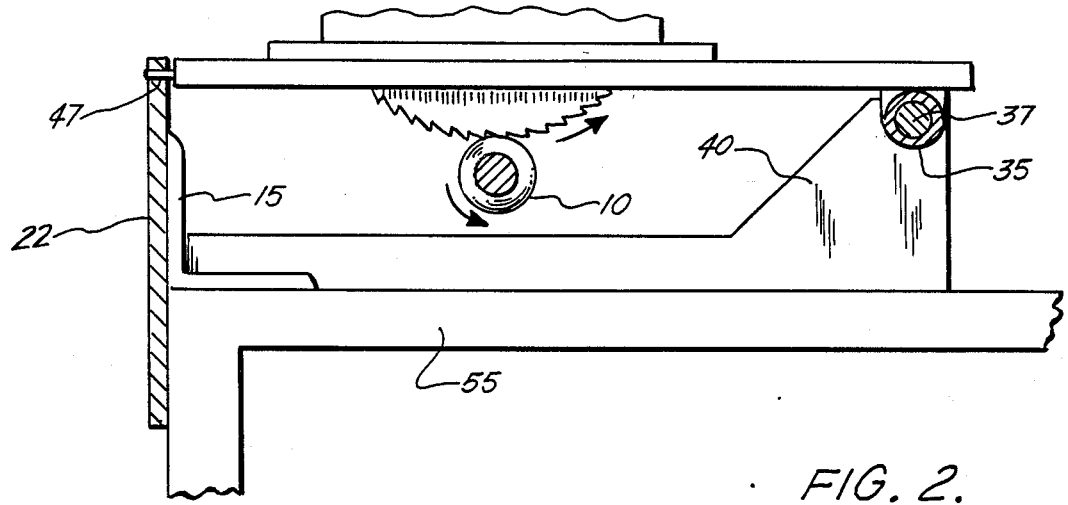
FIG. 2 is a fragmentary end view of the apparatus of FIG. 1 as viewed from the right of FIG. 1 with an end plate removed to expose the workpiece and cutting blade to view.

Although, as pointed out above, it is preferred that rod 37 and hinges 35, 35 be threaded, it is possible to provide the rod and hinges with matching smooth cylindrical surfaces so that the hinges can slidably travel along the rod as well as rotate thereon. (Such a construction can be readily visualized by viewing FIG. 2.) In this less preferred embodiment, platform 32 and rotary power saw 30 are caused to move longitudinally by the application by the operator of controlled manual pressure in the desired direction upon the platform or the handle or casing of the motor of the power saw or like rotary cutting blade assembly.

If desired, handles (not shown) may be affixed to platform 32 to facilitate this longitudinal movement.

Stylus or pin 47 is affixed to platform 32 and supports the platform (and rotary power saw 30) on the side opposite to hinges 35, 35 and rod 37 by resting upon the upwardly facing surface 25 of template 22. As platform 32 is caused to move longitudinally, pin 47 moves along and follows the contours of surface 25 and thereby causes the platform as it moves longitudinally to pivot upwardly or downwardly or to remain at the same elevation, all in response to the configuration of the contoured surface along and on which pin 47 is traveling.

If desired, a control panel 50 may be provided in the apparatus for electrical on-off switches and the like. And as indicated in the Drawings, the apparatus of this invention will usually be positioned on a suitable work table 55 which, for commercial installations, may be an integral part of the apparatus. Ordinarily however, table 55 will be a conventional work bench or the like.

To use the apparatus, workpiece 10 is fastened in place between end plates 12 and 14, the distance between which is adjusted to accommodate the length of the workpiece. With template 22 fastened tightly in the proper position for disposing cutting blade 33 in position for cutting the profile desired in workpiece 10, and with platform 32 moved into a position where pin 47 will engage the template at one end of the upright contoured surface, motor 20 and the motor of power cutting unit 30 are switched on and the platform is rotated downwardly so that the rotating cutting blade is in the desired position relative to the rotating workpiece as pin 47 engages surface 25. Thereupon, knob 43 is rotated more or less continuously so that platform 32 and unit 30 are moved longitudinally over and along the axis of workpiece 10. As pin 47 is moved longitudinally and upwardly or downwardly by undulations in surface 25, platform 32 is similarly moved upwardly or downwardly so that cutting blade 33 is likewise moved upwardly or downwardly relative to workpiece 10. In this way the depth of the cut is altered in response to the contour of surface 25 so that the workpiece is shaped to the desired profile.

It will thus be seen that the assembly of this invention as exemplified by the preferred embodiment depicted in the Drawings makes effective use of the force of gravity to insure replication from piece to piece. In other words, the weight of platform 32 and rotary power saw 30 is utilized for keeping pin 47 in registration with the upper surface 25 of template 22 and thus, ultimately, for shaping the workpiece. The only input from the operator is rotation of knob 43 or, in cases where hinges 35, 35 slidably travel on rod 37, application of suitably directed and controlled force to cause platform 32 to travel longitudinally in the desired direction at an appropriate rate of travel for effecting smooth shaping of the workpiece. If desired, power means (not shown) may be provided for rotating rod 37 at a uniform or adjustable rate of speed and in the desired direction for effecting the longitudinal movement of platform 32.

It will of course be self-evident from the above that stylus or pin 47 should be made from strong, wear resistant material(s) that will not be bent r distorted by the weight of platform 32 and the power driven saw assembly 30 supported thereon or prematruely or excessively abraded by its frictional travel on the contoured surface 25 of template 22. Thus pins made from steel or other suitable strong, wear resistant metal alloys are recommended. Pins made from certain rigid, very strong, tough and durable plastic materials may also be found suitable. The pin should of course be relatively small in cross section so that it will accurately follow small changes in the contoured surface of the template. Good results have been obtained using a cylindrical steel pin having a diameter of one-eighth ($\frac{1}{8}$) mils made from steel.

Likewise, the template or at least its upstanding surface should be fabricated from a strong, rigid, wear resistant material so that it will not be distorted or prematurely or excessively abraded by the travel of the pin thereon. In short, the template should have sufficient dimensional stability, strength and wear resistance to withstand appreciable changes in shape during use. Templates made from steel or other suitable metal alloys or plastics are thus recommended. Platform 32, rod 37, and stanchions 40, 40 should likewise be made from strong, rigid materials so that they will maintain their structural integrity during repeated usage of the apparatus.

In most cases, the weight of platform 32 and of the power-driven rotary cutting unit 30 will be sufficient to keep pin 47 in constant registration with surface 25 of the template as the pin is traveling thereon and blade 33 is shaping workpiece 10. However, if necessary, additional weights may be added to the platform or the operator may apply an appropriate amount of downward manual pressure to the platform or to the casing or handle of the motor of unit 30.

As can be seen from the Drawings (FIGS. 1 and 3, for example), it is desirable to position motor 20 and the power driven rotary cutting unit 30 so that they are facing in the same direction. This will cause workpiece 10 and cutting blade 33 to be rotated in the same direction. In this way, the cutting blade and the workpiece are actually moving in opposite directions at the point or zone of contact between them.

It will be seen from the Drawings that platform 32, template 22, and end plates 12, 14 form a shield over and around cutting blade 33. Thus the operator using the device is not exposed to, nor likely to come in contact with, the rotating blade. If desired, a vertical wall may be placed below rod 37 to still further encase the cutting blade.

In an assembly of this invention generally as depicted in the Drawings, excellent results were achieved using a Skilsaw (7¼ inch blade), Model 574 operating at 4600 rpm as the power saw 30, a Black & Decker Model 7004 Type 1 electric hand drill operating at 2200 rpm as the power means for rotating the workpiece. Rod 37 and hinges 35, 35 had machine threads with a pitch of 11 threads per inch. Rod 37 was rotated manually at a rate such that the cutting blade traveled one foot in about 2 to 3 minutes. Template 22 was made of plywood and pin 47 was one-eighth (⅛) inch in diameter and made of steel.

The total weight of platform 32 and the power saw bolted thereon was approximately eighteen (18) pounds.

As noted above, sub-assemblies of this invention comprise the various elements discussed above with reference to the Drawings except that either or both of motor 20 and the power-driven rotary cutting unit 30 may be omitted from the sub-assembly as produced. The operator can utilize a separate power hand drill unit and/or a separate rotary power saw or the like with such sub-assemblies.

Experiments conducted with apparatus of this invention have shown that the apparatus can be easily used by persons having little or no prior experience or skill in woodworking. All that is required is the exercise of reasonable care—the same standard of care as one should use when using any conventional power tools such as power saws and the like. Further, the finished product is of high quality and requires at most only a minimum of sand papering or the like to provide spindles having very smooth exterior surfaces. Square wood stock has been easily and effectively transformed into shaped spindles by means of the apparatus of this invention. Moreover, spindles having a very wide range of diameters along their lengths have been produced using such apparatus. For example, wood stock has been turned with the apparatus to give linear segments about ¼ inch in diameter and adjacent spherical segments reaching about 1½ inches in diameter. In short, a wide range of configurations and shapes may be readily produced with the apparatus of this invention, workpiece breakage is rare, prior experience, skill or training are not required, and replication of identically-shaped pieces is readily achieved. And all of these advantages can be achieved at low cost using relatively inexpensive equipment.

Ordinarily the apparatus of this invention will be utilized for producing shaped spindles of wood or plastic materials. However the principles of this invention may be extended to forming metal spindles and the like provided that a suitably hard and durable cutting edge is provided in the cutting blade 33.

While the invention has been specifically described with reference to use of a table saw in the cutting assembly, at least equally good results are achieved by using a radial arm saw instead.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof.

What is claimed is:

1. Spindle forming apparatus which comprises:
    (a) means for rotating a workpiece in a fixed position about an axis;
    (b) a template adapted to be laterally spaced from and aligned with said axis, the template having an upstanding surface contoured to the profile to be formed in the workpiece;
    (c) a rotatable power-driven cutting blade assembly including a prime mover for effecting rotation of the cutting blade in the same direction as the direction of rotation of the workpiece;
    (d) support means (i) pivotally supported on an axial center of rotation which is laterally spaced from and aligned with said axis and is disposed on the side of said axis opposite the side on which the template is positioned, and (ii) longitudinally movable with respect to at least a portion of said axis and pivotally supporting the power-driven cutting blade assembly including the prime mover thereof substantially directly above the workpiece so that the cutting blade can be (a) brought into contact with the upper portion of the workpiece with the blade and the workpiece moving in opposite directions at the point of zone of contact therebetween and (b) moved along and above at least a portion of said axis with the weight of the power-driven cutting blade assembly including the prime mover thereof being substantially directly above the workpiece; and
    (e) tracing means disposed on said support means so as to be in registration with the contoured surface of the template and adapted, by virtue of the weight of the support means and the power-driven cutting blade assembly including the prime mover thereof, to stay in registration with said contoured surface as the support means is moved longitudinally with respect to at least a portion of said axis, the distance between the cutting blade and the axis of the workpiece being defined by the registration between the tracing means and the contoured surface of the template.

2. Apparatus in accordance with claim 1 wherein the rotatable power-driven cutting blade assembly is a rotary saw driven by an electric motor.

3. Apparatus in accordance with claim 1 wherein the means for rotating the workpiece includes an electric hand drill unit, the chuck of which is connected to effect rotation of the workpiece.

4. Apparatus in accordance with claim 1 wherein the means for rotating the workpiece comprises (i) a headstock adapted to grip and rotate one end of the workpiece, (ii) a tailstock adapted to be positioned to secure and allow free rotation of the other end of the workpiece, and (iii) a motor adapted to rotate the headstock.

5. Apparatus in accordance with claim 1 wherein the rotatable power-driven cutting blade assembly is a rotary saw driven by an electric motor and wherein the means for rotating the workpiece includes an electric hand drill unit.

6. A sub-assembly adapted for use in forming spindles having a predetermined profile in which the sub-assembly comprises:
   (a) rotatable means for detachably securing a workpiece in a fixed position so that the workpiece can be rotated about a first axis while in said fixed position;
   (b) an elongate template having a surface contoured to the profile to be formed in the workpiece;
   (c) means for receiving, detachably securing and supporting a rotary saw having a cutting blade driven by an electric motor above the workpiece such that (i) the cutting blade is in an upright position transverse to said first axis and with the lower portion of the cutting edge of the cutting blade extending outwardly from the means of (c) so as to be contactable with the workpiece, and (ii) said rotary saw and electric motor, and the weight thereof are disposed substantially directly above the workpiece;
   (d) means for pivotally supporting the means of (c) along a second axis aligned with and laterally displaced from said first axis so that the cutting edge of the cutting blade can be brought into contact with the upper portion of the workpiece when the workpiece is in said fixed position, the means of (d) being further characterized by enabling longitudinal movement of the same of (c) so that when the workpiece is in said fixed position, the cutting edge of the cutting blade can be moved along and above at least a portion of said first axis with the weight of said rotary saw and electric motor being substantially directly above the workpiece;
   (e) means for securing the template along a third axis with the contoured surface of the template facing upwardly, the third axis being laterally displaced from said first axis, said second axis and said third axis being on opposite sides of said first axis; and
   (f) tracing means disposed on said means of (c) so as to be in registration with the contoured surface of the template and adapted, by virtue of the weight of the support means and said rotary saw and electric motor, to remain in registration with said contoured surface as the means of (c) is moved longitudinally with respect to at least a portion of said first axis.

7. Apparatus of claim 6 wherein said means of (e) is further characterized by enabling the position of the template to be raised or lowered relative to the workpiece.

8. Apparatus of claim 6 wherein said means of (d) includes machine thread means which upon rotation cause said means of (c) to be moved longitudinally relative to said axes.

9. Apparatus of claim 6 wherein the rotatable means of (a) comprises (i) a headstock adapted to grip and rotate one end of the workpiece and (ii) a tailstock adapted to be positioned to secure and allow free rotation of the other end of the workpiece.

10. Apparatus of claim 6 wherein said means of (e) is further characterized by enabling the position of the template to be raised or lowered relative to the workpiece; and wherein said means of (d) includes machine thread means which upon rotation cause said means of (c) to be moved longitudinally relative to said axes.

11. Apparatus of claim 10 wherein the rotatable means of (a) comprises (i) a headstock adapted to grip and rotate one end of the workpiece and (ii) a tailstock adapted to be positioned to secure and allow free rotation of the other end of the workpiece.

12. Apparatus in accordance with claim 6 wherein the means of (c) is adapted to receive, detachably secure and support said rotary saw in position such that the cutting blade thereof and the workpiece can be rotated in the same direction so that the blade and the workpiece will be moving in opposite directions at the point or zone of contact therebetween.

13. Apparatus in accordance with claim 6 wherein the rotatable means for detachably securing a workpiece in a fixed position includes an electric hand drill unit, the chuck of which is positioned and adapted to rotate the workpiece in the same direction as the cutting blade so that the blade and the workpiece will be moving in opposite directions at the point or zone of contact therebetween.

* * * * *